US010159009B2

(12) United States Patent
Zhou et al.

(10) Patent No.: US 10,159,009 B2
(45) Date of Patent: Dec. 18, 2018

(54) METHOD AND APPARATUS FOR ADAPTATION OF EDCA PARAMETERS TO ENSURE ACCESS BY A WIRELESS NODE

(71) Applicant: QUALCOMM Incorporated, San Diego, CA (US)

(72) Inventors: Yan Zhou, San Diego, CA (US); Gwendolyn Denise Barriac, Encinitas, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 15/292,083

(22) Filed: Oct. 12, 2016

(65) Prior Publication Data

US 2018/0103390 A1   Apr. 12, 2018

(51) Int. Cl.
| | |
|---|---|
| *H04W 28/02* | (2009.01) |
| *H04W 24/08* | (2009.01) |
| *H04W 28/06* | (2009.01) |
| *H04W 74/08* | (2009.01) |
| *H04W 84/12* | (2009.01) |

(52) U.S. Cl.
CPC ....... *H04W 28/0252* (2013.01); *H04W 24/08* (2013.01); *H04W 28/06* (2013.01); *H04W 74/08* (2013.01); *H04W 74/0816* (2013.01); *H04W 84/12* (2013.01)

(58) Field of Classification Search
None
See application file for complete search history.

(56) References Cited

U.S. PATENT DOCUMENTS

| 7,894,467 | B2 | 2/2011 | Hunzinger | |
|---|---|---|---|---|
| 9,072,073 | B2 | 6/2015 | Kneckt et al. | |
| 9,185,726 | B2 | 11/2015 | Wentink et al. | |
| 2009/0103501 | A1* | 4/2009 | Farrag | H04W 74/02 370/337 |
| 2010/0074263 | A1* | 3/2010 | Bry | H04L 12/2834 370/401 |

(Continued)

FOREIGN PATENT DOCUMENTS

EP    2894928 A1    7/2015

OTHER PUBLICATIONS

Lin P., et al., "Achieving Airtime Fairness of Delay-Sensitive Applications in Multirate IEEE 802.11 Wireless LANs", IEEE Communications Magazine, Sep. 2011, pp. 169-175.

(Continued)

*Primary Examiner* — Otis L Thompson, Jr.
(74) *Attorney, Agent, or Firm* — Loza & Loza, LLP

(57) ABSTRACT

Various aspects of the disclosed approach attempts to provide suitable contention access by an Access Point (AP) to a communications medium shared with a plurality of stations (STAs) by adapting Enhanced Distributed Channel Access (EDCA) parameters for the AP. Generally, the disclosed approach includes determining a metric value by measuring an amount of access of a medium by a device over a first period of time; and changing, based on the metric value, a contention parameter of the device if a target metric value associated with access of the medium for the device is not achieved while a limit of the contention parameter has not been reached.

20 Claims, 8 Drawing Sheets

(56) References Cited

U.S. PATENT DOCUMENTS

| | | | | |
|---|---|---|---|---|
| 2010/0103913 | A1* | 4/2010 | Sung | H04W 74/006 370/338 |
| 2011/0225440 | A1* | 9/2011 | Kwon | H04W 52/0235 713/323 |
| 2012/0106371 | A1* | 5/2012 | Abraham | H04B 7/0452 370/252 |
| 2014/0198642 | A1* | 7/2014 | Barriac | H04W 74/08 370/230 |
| 2015/0016268 | A1 | 1/2015 | Merlin et al. | |
| 2015/0124601 | A1* | 5/2015 | Li | H04W 28/08 370/230 |
| 2015/0244601 | A1* | 8/2015 | Wentink | H04L 43/04 370/253 |
| 2015/0257174 | A1* | 9/2015 | Liu | H04W 74/085 370/235 |
| 2015/0281980 | A1* | 10/2015 | Zhou | H04W 24/02 370/254 |
| 2016/0212768 | A1 | 7/2016 | Wentink | |
| 2017/0019818 | A1* | 1/2017 | Xing | H04B 7/00 |
| 2017/0041961 | A1* | 2/2017 | Zou | H04W 74/0875 |
| 2017/0188360 | A1* | 6/2017 | Yu | H04W 72/0446 |
| 2017/0347376 | A1* | 11/2017 | Sakai | H04W 72/08 |

OTHER PUBLICATIONS

Cariou L., et al., "2 Sets of EDCA Parameters", Sep. 12, 2016, XP055429248, IEEE 802.11 Mentor Public Documentation Portal Retrieved from the Internet: URL:https://mentor.ieee.org/802.11/dcn/16/11-16-0998-03-00ax-rules-for-2-edca-parameters.pptx [retrieved on Nov. 27, 2017], 32 pages.

International Search Report and Written Opinion—PCT/US2017/053559—ISA/EPO—dated Jan. 2, 2018.

Jing Ma (NICT): "EDCA Rules—Follow up 1; 11-16-0962-01-00ax-edca-rules-8211-follow-up-1", IEEE Draft; IEEE-SA Mentor, Piscataway, NJ USA, vol. 802.11ax, No. 1, Jul. 27, 2016, pp. 1-9, XP068107323, Retrieved from the Internet: URL:https://mentor.ieee.org/802.11/dcn/16/11-16-0962-01-00ax-edca-rules-8211-follow-up-1.pptx [retrieved on Jul. 27, 2016].

Jing Ma (NICT): "EDCA Rules—Follow up 2; 11-16-0963-01-00ax-edca-rules-8211-follow-up- 2", IEEE Draft; IEEE-SA Mentor, Piscataway, NJ USA, vol. 802.11ax, No. 1, Jul. 27, 2016, pp. 1-9, XP068107327, Retrieved from the Internet: URL:https://mentor.ieee.org/802.11/dcn/16/11-16-0963-01-00ax-edca-rules-8211-follow-up-2.pptx [retrieved on Jul. 27, 2016].

Jing Ma., (NICT): "Further Consideration on Channel Access Rule to Facilitate MU Transmission Opportunity; 11-16-0662-01-00ax-further-consideration-on-channel-access-rule-to-facilitate-mu-transmission-opportunity", IEEE Draft; IEEE-SA Mentor, Piscataway, NJ USA, vol. 802.11ax, No. 1, May 18, 2016, pp. 1-6, XP068119537, Retrieved from the Internet: URL:https://mentor.ieee.org/802.11/dcn/16/11-16-0662-01-00ax-further-consideration-on-channel-access-rule-to-facilitate-mu-transmission-opportunity.pptx [retrieved on May 18, 2016], 6 pages.

Jinsoo Ahn., (Yonsei Univ): "AP Access Procedure for Ul MU Operation; 11-16-0960-01-00ax-ap-access-procedure-for-ul-mu-operation", IEEE Draft; IEEE-SA Mentor, Piscataway, NJ USA, vol. 802.11ax, No. 1, Jul. 27, 2016, pp. 1-22, XP068107318, Retrieved from the Internet: URL:https://mentor.ieee.org/802.11/dcn/16/11-16-0960-01-00ax-ap-access-procedure-for-ul-mu-operation.pptx [retrieved on Jul. 27, 2016].

* cited by examiner

METHOD AND APPARATUS FOR ADAPTATION OF EDCA PARAMETERS TO ENSURE ACCESS BY A WIRELESS NODE

BACKGROUND

Field

Aspects of the present disclosure relate generally to wireless communication systems, and more particularly, to a method and apparatus for adaptation of EDCA parameters to ensure access by a wireless node.

Background

Wireless local area network (WLAN) technology has become one of the most prominent wireless access technologies because of its ease of installation and offering of benefits. WLANs are found ubiquitously in both consumer and commercial environments, and provide not only packet data services but also such multimedia applications as voice over Internet Protocol (VoIP) and video streaming. Almost all WLANs operate under the same specification promulgated by the Institute of Electrical and Electronics Engineers (IEEE), which is the IEEE 802.11 standard. The IEEE 802.11 standard includes specifications for various aspects of the PHY and MAC layers of the WLAN. In one example, at the PHY layer, IEEE 802.11 defines multiple modulation and coding schemes that support various transmission rates. In another example, at the MAC layer, IEEE 802.11 defines multiple-access mechanisms that provide each device in the WLAN statistically equal probability for access to a wireless channel.

The amount of network traffic on WLANs have continued to increase due to the proliferation of devices and the variety of multimedia applications provided thereby. For example, a single WLAN may have to support VoIP, video streaming, and/or data transmissions with multiple devices. Problems arise when multiple devices simultaneously desire access to the wireless channel and there are insufficient network resources to support them. Revisions of IEEE 802.11 continue to increase the amount of traffic that may be communicated in a WLAN, but lack of network capacity is only one facet of the problem because each type of traffic may have different requirements that are not addressed by being able to transmit larger amounts of data. For example, both audio and video streaming have latency requirements that must be met or playback may be "choppy". VoIP has different and arguably more stringent timing requirements because even though the size of each transmission may be small, latency of these transmissions must be kept under a particular range because humans are sensitive to delays in speech.

Consequently, more sophisticated multiple-access mechanisms are desired to ensure access by all devices while traffic having different timing constraints are handled in an appropriate manner.

SUMMARY

The following presents a simplified summary of one or more aspects of the disclosed method and apparatus for adaptation of EDCA parameters to ensure access by a wireless node, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect of the disclosure, an apparatus for wireless communication is described having a processing system configured to determine a metric value by measuring an amount of access of a medium over a first period of time; and change, based on the metric value, a contention parameter for access to the medium if a target metric value associated with access of the medium is not achieved while a limit of the contention parameter has not been reached.

In another aspect of the disclosure, a method for wireless communication is described that includes determining a metric value by measuring an amount of access of a medium over a first period of time; and changing, based on the metric value, a contention parameter of the device for access to the medium if a target metric value associated with access of the medium is not achieved while a limit of the contention parameter has not been reached.

In yet another aspect of the disclosure, a computer-readable storage medium comprising code for determining a metric value by measuring an amount of access of a medium over a first period of time; and changing, based on the metric value, a contention parameter for access to the medium if a target metric value associated with access of the medium is not achieved while a limit of the contention parameter has not been reached.

In yet another aspect of the disclosure, an apparatus for wireless communication is described that includes means for determining a metric value by measuring an amount of access of a medium over a first period of time; and means for changing, based on the metric value, a contention parameter for access to the medium if a target metric value associated with access of the medium is not achieved while a limit of the contention parameter has not been reached.

In yet another aspect of the disclosure, a wireless node that includes an antenna; a transceiver coupled to the antenna and configured to communicate over a medium via the antenna. The wireless device also includes a processing system coupled to the transceiver, the processing system configured to determine a metric value associated with access of the medium by the transceiver by measuring an amount of access of the medium over a first period of time; and change, based on the metric value, a contention parameter for access to the medium if a target metric value associated with access of the medium is not achieved while a limit of the contention parameter has not been reached.

These and other aspects of the disclosure will become more fully understood upon a review of the detailed description, which follows.

BRIEF DESCRIPTION OF THE DRAWINGS

These and other sample aspects of the disclosure will be described in the detailed description that follow, and in the accompanying drawings.

Figure 1:
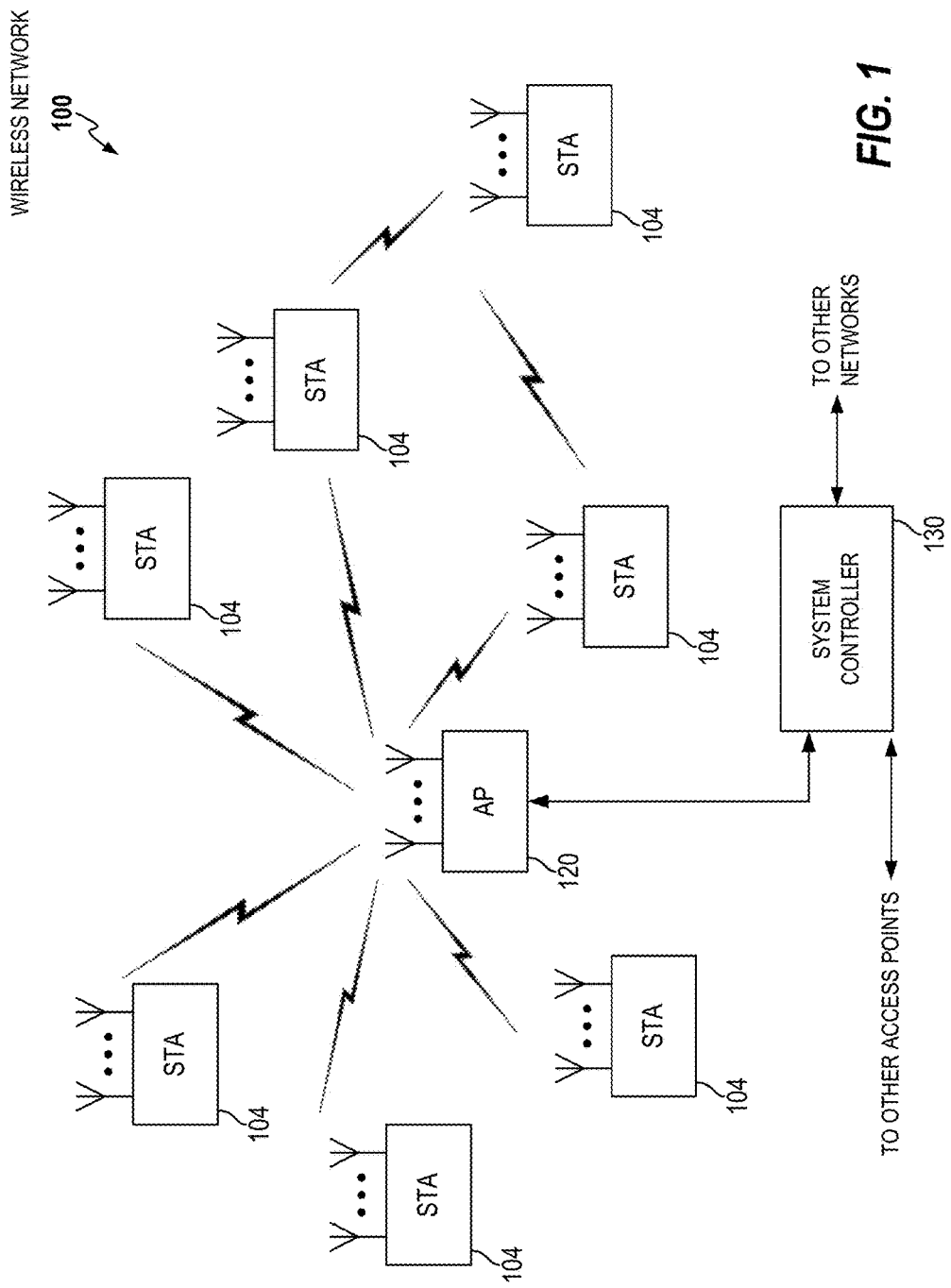
FIG. 1 is a block diagram conceptually illustrating a system in which various aspects of the method and apparatus for adaptation of EDCA parameters to ensure access by a wireless node may be described.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The techniques described herein may be applied to various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (II-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may be an access point or an access terminal.

An access point (AP) may include, be implemented as, or known as, a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may include, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

As used herein, the term multi-user (MU) transmission generally refers to a transmission from an AP to multiple STAs (whether sent as simultaneous or sequential frames within a transmit opportunity) or to a transmission to an AP from multiple STAs (whether sent as simultaneous or sequential packets within a transmit opportunity), while the term single user (SU) transmission generally refers to a transmission from an AP to a STA or to a transmission to an AP from a STA.

Aspects of the present disclosure generally relate to contention and backoff behavior of an AP and STAs of a Wireless Local Access Network (WLAN) in uplink/downlink MU and SU protocols over a medium, which may also be a medium shared by multiple devices. As will be described in more detail herein, a STA involved in MU operations may be allowed to send unsolicited SU transmissions in an SU mode. The STA will contend for access to the medium for these SU frames. The AP must also contend for access to the medium for communicating MU frames. A detailed discussion of the various MU frames that may be communicated by an AP is beyond the scope of the discussion contained herein but examples of such MU frames communicated by an AP include trigger frames (TF) in addition to UL/DL MU frames that may be transmitted by the AP and the STA. Trigger frames are used to allocate resource for UL MU transmission and to solicit UL MU transmissions from STAs. The trigger frame also carries information required by a responding STA in order to send a UL MU transmission, e.g. MCS and ACK policy for UL MU transmission.

In the presence of a large number of STAs in SU mode in UL, an AP may not have sufficient air time for DL/UL MU transmissions due to heavy contention. As a consequence, system efficiency will be reduced because MU transmissions generally utilizes resources more effectively. According to certain aspects in the disclosed approach, the AP may increase its access to the medium by controlling Enhanced Distributed Channel Access (EDCA) parameters.

FIG. 1 illustrates a system 100 in which aspects of the disclosure may be described. The system 100 may be, for example, a WLAN that operates under Multi-User Multiple-Input Multiple-Output (MU-MIMO) as introduced by IEEE 802.11ac. The system 100 includes an AP 120 and a set of STAs 104 that make up a Basic Service Set (BSS). A system controller 130 may provide coordination and control for the AP 120 and other APs. The AP 120 may be managed by the system controller 130, for example, which may handle adjustments to radio frequency power, channels, authentication, and security used by the AP 120. The system controller 130 may communicate with all APs using one or more backhaul communications links. The AP 120 may also communicate with other APs, either directly or indirectly, using one or more backhaul communications links. The backhaul communications links may be wireless or wireline. To avoid overcomplicating the description herein, although the system 100 may include multiple APs, only a single AP such as the AP 120 is shown in FIG. 1.

In accordance with various aspects of the disclosure, because the system 100 implements a MU-MIMO WLAN, the AP 120 may communicate with one or more of the STAs 104 at any given moment on multiple communication links. Compared to Single-user MIMO (SU-MIMO), which focuses on transmissions to a single destination, MU-MIMO is able to increase throughput because MU-MIMO supports communication with multiple spatially separated STAs to simultaneously communicate with the AP. These MU-MIMO transmissions occur over two communications paths, an uplink and a downlink. In the downlink, which is also referred to as the forward link, an AP may transmit data to a group of STAs in parallel. In the uplink, also referred to as the reverse link, multiple STAs may simultaneously transmit frames to an AP.

Figure 2:
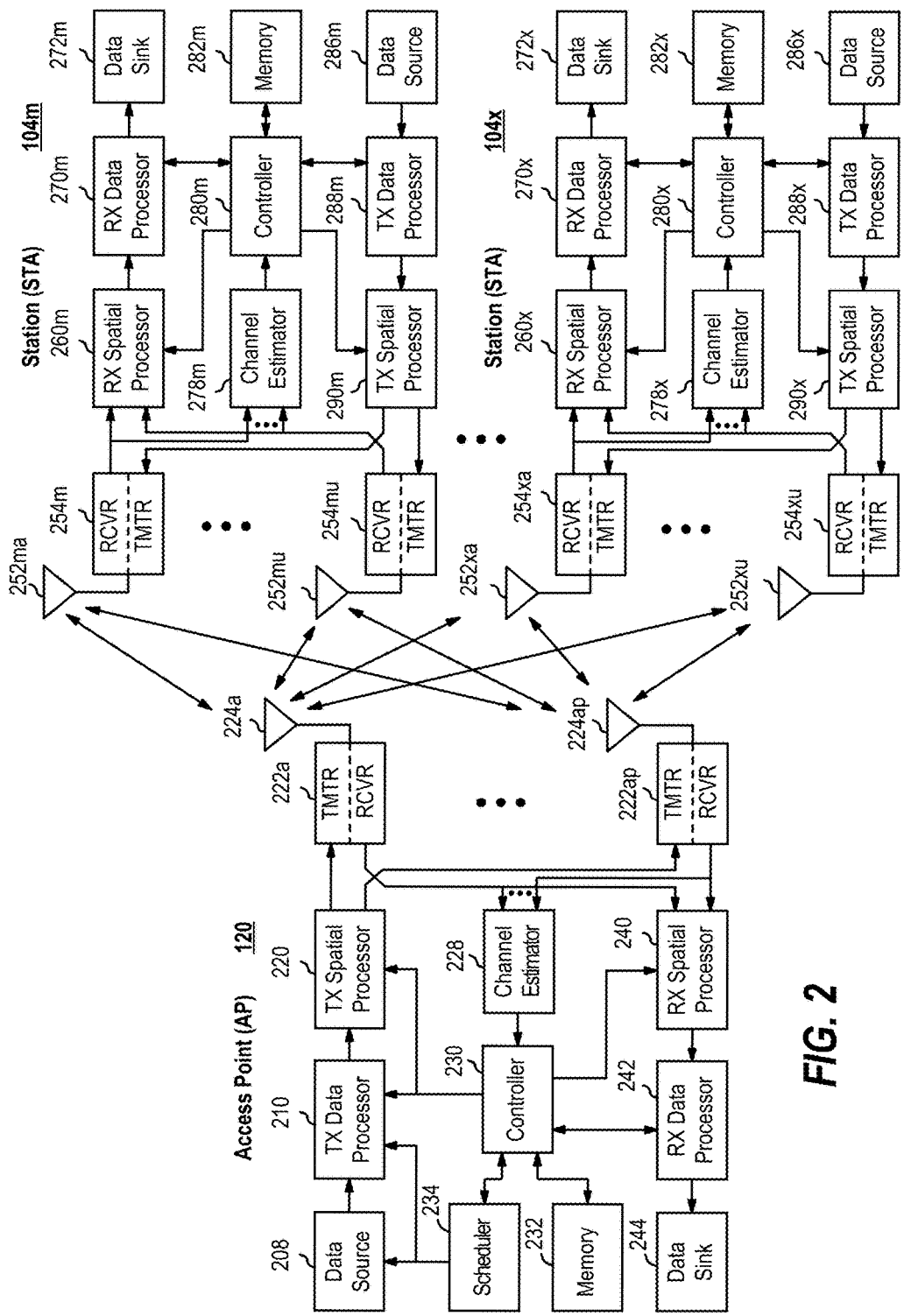
FIG. 2 is a block diagram of an access point (AP) and stations (STAs) in which various aspects of the method and apparatus for adaptation of EDCA parameters to ensure access by a wireless node may be described.

FIG. 2 illustrates block diagram of the AP 120 and two STAs 104m and 104x from the set of STAs 104s. The AP 120 is equipped with $N_t$ antennas 224a through 224ap. The STA 104m is equipped with $N_{ut,m}$ antennas 252ma through 252mu, and the STA 104x is equipped with $N_{ut,x}$ antennas 252xa through 252xu. In accordance with the explanation provided above, the AP 120 is a transmitting entity for the DL and a receiving entity for the UL. Each STA 104 is a transmitting entity for the UL and a receiving entity for the DL. As used herein, a "transmitting entity" is an independently operated apparatus or device capable of transmitting data using a wireless channel, and a "receiving entity" is an independently operated apparatus or device capable of receiving data using a wireless channel. In the following description, the subscript "dn" denotes the DL, the subscript "up" denotes the UL, $N_{up}$ STAs are selected for simultaneous transmission on the UL, $N_{dn}$ STAs are selected for simultaneous transmission on the DL, $N_{up}$ may or may not be equal to $N_{dn}$, and $N_{up}$ and $N_{dn}$ may be static values or can change for each scheduling interval. The beam-steering or some other spatial processing technique may be used at the AP and STA.

On the UL, at each STA 104 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP.

Up to $N_{up}$ STAs may be scheduled for simultaneous transmission on the uplink. Each of these STAs performs spatial processing on its data symbol stream and transmits its set of transmit symbol streams on the uplink to the AP.

At the AP 120, $N_{ap}$ antennas 224a through 224ap receive the uplink signals from all $N_{up}$, STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at the AP 120, a TX data processor 210 receives traffic data from a data source 208 for $N_{dn}$ STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. The TX data processor 210 provides $N_{dn}$ downlink data symbol streams for the $N_{dn}$ STAs. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STAs. The decoded data for each STA may be provided to a data sink 272 for storage and/or a controller 280 for further processing.

At each STA 104, $N_{ut,m}$ antennas 252 receive the $N_{ap}$ downlink signals from the AP 120. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 104, a channel estimator 278 estimates the downlink channel response and provides downlink channel estimates, which may include channel gain estimates, signal-to-noise ratio (SNR) estimates, noise variance and so on. Similarly, at the AP 120, a channel estimator 228 estimates the uplink channel response and provides uplink channel estimates. The controller 280 for each STA typically derives the spatial filter matrix for the STA based on the downlink channel response matrix $H_{dn,m}$ for that STA. The controller 230 derives the spatial filter matrix for the AP based on the effective uplink channel response matrix $H_{up,eff}$. The controller 280 for each STA may send feedback information (e.g., the downlink and/or uplink eigenvectors, eigenvalues, SNR estimates, and so on) to the AP. The controllers 230 and 280 also control the operation of various processing units at AP 120 and STA 104, respectively.

While portions of the following disclosure will describe the STAs 104 capable of communicating using MIMO techniques, for certain aspects the STAs 104 may also include some STAs that do not support MIMO. Thus, for such aspects, the AP 120 may be configured to communicate with both MIMO and non-MIMO STAs. This approach may conveniently allow older versions of STAs, known as "legacy" STAs, to remain deployed in an enterprise, extending their useful lifetime while allowing newer MIMO STAs to be introduced as deemed appropriate.

A frame structure may be used for data transmission between wireless stations such as a transmitter station and a receiver station. In one aspect, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

Figure 3B:
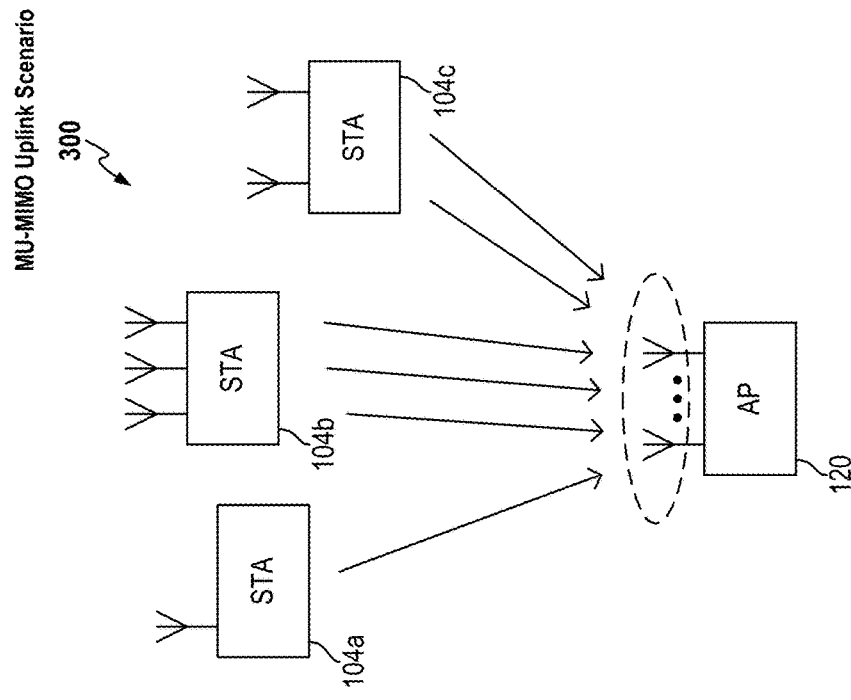
FIG. 3A, 3B are block diagrams of communications scenarios that may occur between the AP and the STAs of FIG. 2.
Figure 3A:
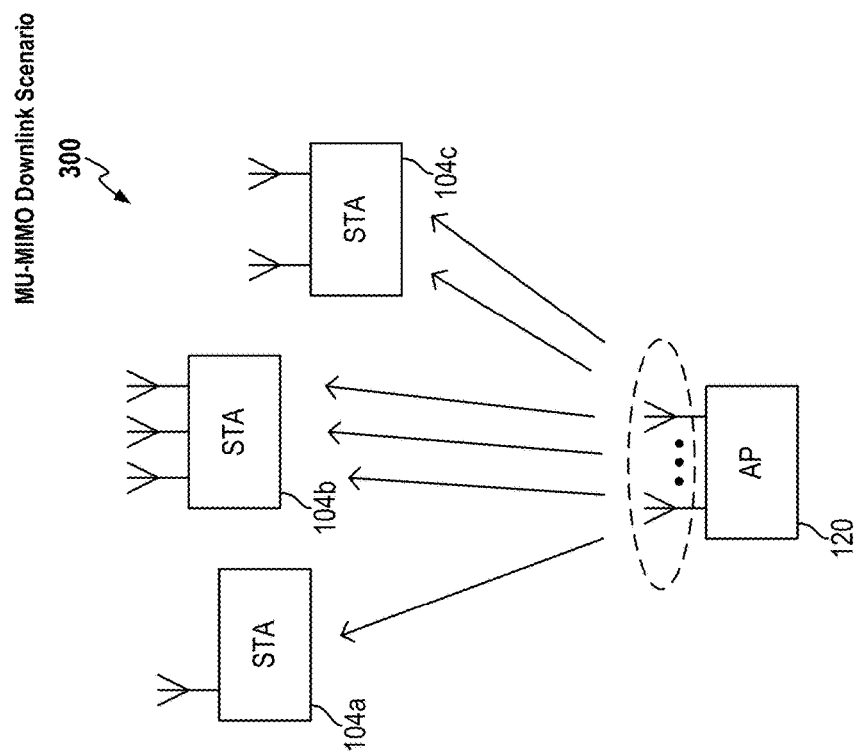

FIG. 3A and FIG. 3B illustrates downlink and uplink communication scenarios, respectively, that may occur between an AP such as the AP 120 and multiple STAs such as the STAs 104 of FIG. 1 for MU-MIMO. In the downlink scenario of FIG. 3A, the MU-MIMO transmissions from the AP 120 occurs simultaneously to the STA 104a, the STA 104b, and the STA 104c. In the downlink scenario of FIG. 3B, the MU-MIMO transmissions to the AP 120 occurs simultaneously from the STA 104a, the STA 104b, and the STA 104c. In both figures, only three STAs that are in the set of STAs 104, referred to as a STA 104a with a single antenna, a STA 104b with three (3) antennas, and a STA 104c with two (2) antennas, are specifically referred to in order to promote clarity in the description. In general, regardless of whether a particular MU-MIMO transmission is uplink or downlink, scheduling of which STAs will participate in the particular MU-MIMO transmission is required. For example, in a downlink MU-MIMU transmission, STAs may be selected to be in the group of STAs based on criteria such as queue occupancy and spatially correlation between STAs. A detailed discussion of the scheduling techniques and approaches that may be used to select which STAs are chosen for the group of STAs from the set of STAs 104 is beyond the scope of the present disclosure and in the communication scenarios of FIG. 3A and FIG. 3B, the group of selected STAs includes the STA 104a, the STA 104b, and the STA 104c. However, it should be obvious that the group of STAs in FIG. 3A does not have to be the same group of STAs in FIG. 3B. It would be understood by those of ordinary skill in the art that fewer, more, or even different STAs from the set of STAs 104 may be included in any particular MU-MIMO transmission.

In addition to participating in MU-MIMO transmissions, the STAs in the set of STAs 104 may also be allowed to generate unsolicited SU frames for transmission to the AP 120. In other words, STAs participating in (or capable of participating in) MU operations may still wish to send SU transmissions for relatively urgent matters. These STAs, when in the process or contending for sending or operating to send SU frames, are referred to as operating in SU mode. For example, STAs operating in SU mode to send SU transmissions such as SU frames containing time sensitive data or management information. These SU mode STAs wish to transmit these frames sooner rather than wait to send such data in an MU frame during a MU transmission. Thus, contention allows a STA access to send urgent data in one or more SU frames without having to wait for a scheduled MU transmission. However, because an AP must contend with STAs operating in SU mode, it should follow logically that as contention increases for the medium due to more STAs operating in SU mode, access to the medium decreases by the AP.

In a contention access approach for a communications medium shared by an AP along with a group of devices such as STAs, certain parameters may be used to affect how each STA behaves in contending for access to the communications medium. For example, a contention access approach known as EDCA takes into account quality of service (QoS) in prioritizing transmissions. EDCA utilizes a set of contention parameters, which may also be referred to as "EDCA parameters" or "collision avoidance parameters", that includes a contention window defined by a minimum contention window (CWmin) size and a maximum contention window (CWmax) size, and an arbitration inter-frame space number (AIFSN). EDCA also provides a transmission opportunity (TXOP) period during which contention-free access is available for a particular device granted access.

In accordance with various aspects of the disclosed approach, the system 100 of FIG. 1 may implement QoS-aware contention mechanisms in accordance with those provided by various IEEE 802.11 standards. In general, QoS refers to a set of qualitative and quantitative characteristics that describes the quality of traffic over a network. These characteristics include throughput, packet loss, delay, jitter, and bandwidth utilization. QoS requirements vary from application to application and are typically classified in three dimensions: bandwidth, delay, and data loss.

Bandwidth, which may also be referred to as data rate, transmission rate, bit rate, and capacity, is the amount of data that can be delivered during a given period of time. The amount of data an application can transfer is proportional to the amount bandwidth allocated to that application. For bandwidth-sensitive applications, which are applications that require data transfer at a constant rate, any decrease in bandwidth may result in undesired delays and data loss. For example, multimedia applications such as streaming media, Internet telephony (e.g., VoIP), and videoconferencing, typically require constant bandwidth because their output otherwise may seriously suffer because of variations in bandwidth. Data-centric applications such as email, file sharing, web, and instant messaging applications are more tolerant to any issues related to inconsistent data transfer speeds because these applications are generally concerned with the actual delivery of the data itself.

Delay may refer to transmission, propagation, or any queueing delays encountered during the transmission of a particular packet of data, the sum-total thereof may be referred to as an end-to-end delay. Jitter, which refers to variation in delay, is a related concept because high variations in delay (jitter) results in problems in decoding data. Delay is generally detrimental to interactive or real-time applications such as Internet telephony, videoconferencing, Virtual Reality (VR) environments, and multiplayer network games. Any delay that break the tight constraints on in-time data transfer will severely decrease the performance of these applications.

Data loss generally refers to loss of data packets during communications. Data-centric applications such as email, file transfer, and web documents, which can tolerate occasional delays and low bandwidth, require reliable data transfer because they are intolerant to data loss. However, data loss can generally be tolerated by multimedia applications even though they are bandwidth and delay sensitive. For example, a certain amount of data loss in a multimedia stream may still result in an acceptable, albeit slightly reduced, quality of output (e.g., jerks in video or stuttering in voice output).

The default multiple-access mechanism in IEEE 802.11, referred to as Distributed Coordination Function (DCF), employs a carrier sense multiple access with collision avoidance (CSMA/CA) approach. In CSMA/CA, carrier sensing is used by nodes in an attempt to avoid collisions when transmitting on a shared medium, where a node will only attempt transmission when no other nodes are sensed to be using the medium. When more than one node attempts to transmit simultaneously, resulting in a collision, a binary exponential backoff algorithm at each node determines an amount of time the node will wait before attempting retransmission.

DCF is based on a best-effort service model, without regard to either the type of data being transferred or the application being serviced. In other words, DCF makes its best-effort to deliver frames from sender to receiver as quickly as possible, but does not make any guarantees about delay, bandwidth and packet loss based on the type of data contained in those frames. Because there is no service differentiation, all data traffic types suffer from the same amounts of delays, losses, and/or variations in bandwidth when the network becomes congested. Consequently, DCF does not adequately address the needs of bandwidth, delay, and loss-sensitive applications because they are served in the same way, on the best-effort basis, irrespective of what QoS requirements each particular application may have.

The IEEE 802.11e standard attempts to provide support for QoS support in WLANs contention by using service differentiation. To effect this differentiation, the EDCA contention-based channel access mechanism is used to control how different data traffic types gain access to a shared medium by assignment of a priority, referred to as a User Priority (UP), as well as an Access Category (AC), to each frame. Assignment of a particular UP and AC is based on the QoS requirements of the data traffic type to which a frame belongs such that each frame with a particular priority is mapped to an AC. Each AC is associated with a predetermined set of contention parameters to be used by the frame to contend for the medium.

As shown in Table 1, below, there are eight (8) priority levels in UPs, having numerical value from 0 to 7, and four (4) different categories of ACs. The categories of ACs are background data traffic (AC_BK), best effort data traffic (AC_BE), video data traffic (AC_VI), or voice data traffic (AC_VO), where AC_BK has the lowest priority and AC_VO has the highest priority.

TABLE 1

User Priority (UP) to Access Category (AC) Mappings

| Priority | User Priority (UP) | Access Category (AC) | Designation |
|---|---|---|---|
| Lowest | 1 | AC_BK | Background |
| . | 2 | AC_BK | Background |
| . | 0 | AC_BE | Best Effort |
| . | 3 | AC_BE | Best Effort |
| . | 4 | AC_VI | Video |
| . | 5 | AC_VI | Video |
| . | 6 | AC_VO | Voice |
| Highest | 7 | AC_VO | Voice |

Contention for access to a shared medium in EDCA is enabled by an Enhanced Distributed Channel Access Function (EDCAF), which is an enhanced version of DCF operating under the same principles of CSMA/CA and backoff. However, unlike DCF, EDCAF utilizes a set of parameters associated with each AC for purposes of contention. These contention parameters, described above and referred to as "EDCA parameters" herein, include an Arbitration Inter-Frame Space (AIFS), a minimum and maximum Contention Window size (CWmin and CWmax, respectively), and a Transmission Opportunity (TXOP) Limit, where:

AIFS: The time period during which the medium must be sensed as idle by a STA before a transmission or backoff is started;

CWmin, CWmax: Limits of a random Contention Window used for backoff; and

TXOP Limit: A contention-free interval associated with an AC during which a wireless node can transmit as many frames as possible.

Table 2, below lists default values of CWmin, CWmax, AIFSN, and TXOP Limit for all four ACs.

TABLE 2

Default EDCA Parameter Values

| AC | CWmin (slots) | CWmax (slots) | AIFSN | TXOP Limit (ms) FHSS | TXOP Limit (ms) DSSS |
|---|---|---|---|---|---|
| AC_BK | CWmin | CWmax | 7 | 0 | 0 |
| AC_BE | CWmin | CWmax | 3 | 0 | 0 |
| AC_VI | (CWmin + 1)/2 − 1 | CWmin | 2 | 6.016 ms | 3.008 ms |
| AC_VO | (CWmin + 1)/4 − 1 | (CWmin + 1)/2 − 1 | 2 | 3.264 ms | 1.504 ms |

AIFS is affected by an Arbitration Inter-Frame Space Number (AIFSN), the value of which is different for different ACs. Specifically, AIFS is a variable value that depends on the AC for which the EDCAF is contending such that high priority ACs use smaller values compared to low priority ACs. Effectively, this means that higher priority ACs wait a small AIFS time period before they can access the medium while lower priority ACs wait a longer AIFS time period. AIFS may be determined by the following formula:

$$AIFS = AIFSN \times aSlotTime + aSIFSTime \quad (1)$$

where aSlotTime is the slot time, and aSIFSTime is the Short Inter-Frame Space (SIFS) time period. AIFSN specifies the number of time slots in addition to the SIFS time period of which the AIFS consists. The minimum possible value of AIFSN is 2, which means that the minimum length of the AIFS is same as that of DIFS because DIFS is defined to be $2 \times aSlotTime + aSIFSTime$.

The Contention Window size also varies based on the AC such that frames with higher priority ACs choose backoff values from a smaller Contention Window compared to frames with lower priority ACs. A smaller Contention Window will cause the corresponding EDCAF to choose smaller random backoff values and result in waiting a shorter time period before a transmission attempt as the medium becomes idle. Conversely, a larger Contention Window will result in larger random backoff values and thereby longer delays. Referring to Table 2, above, the CWmax values of the higher priority ACs of AC_VI and AC_VO are less than or equal to the CWmin values for the lower priority ACs of AC_BK and AC_BE. Table 3, below, provides example Contention Window values that may be used for different physical layer types, in slots.

TABLE 3

Contention Window Parameters for Different Physical Layers

| | FHSS (slots) | DSSS (slots) |
|---|---|---|
| CWmin | 15 | 31 |
| CWmax | 1023 | 1023 |

EDCA allows contention for TXOPs, wherein a TXOP is a time interval during which a wireless node such as an AP (e.g., the AP 120), or a STA (e.g., one of the STAs in the set of STAs 104) may initiate frame transfer on the medium. TXOP is characterized by a maximum duration, referred to as TXOP Limit. Specifically, when the wireless node obtains access to the medium, the wireless node may begin transmitting such that the transmission duration does not exceed the TXOP Limit. It should be noted that, technically, the multiple frame transmission provided by TXOP is granted to an EDCAF (i.e., an AC) and not to the wireless node, where only transmission of frames of the same AC as of the frame for which the TXOP was obtained is allowed. The TXOP Limit is set in a way such that higher priority AC frames obtain access to the medium for longer durations. A zero value for TXOP means that only one frame can be transmitted during the TXOP. Basically, the higher the priority of an AC, the smaller a value for AIFS, CWmin and CWmax, and the larger a value for TXOP Limit may be used for associated frames.

Figure 4:
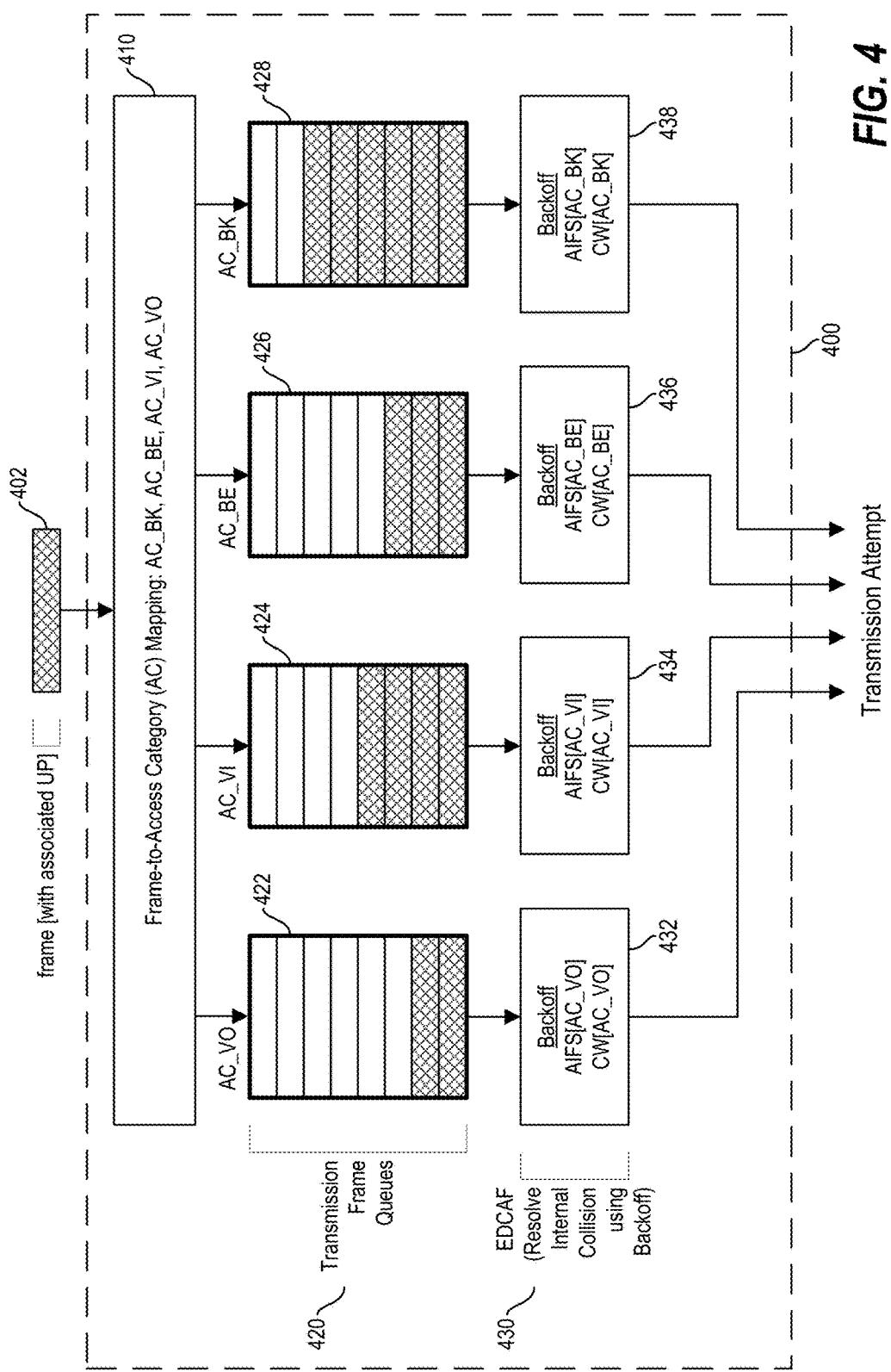
FIG. 4 is a block diagram illustrating a frame processing configuration for processing a frame for a transmission attempt based on EDCA in accordance with various aspects of the disclosed approach.

FIG. 4 illustrates a frame processing configuration 400 that may be implemented in a wireless node such as a STA including one of the STAs 104 or an AP such as the AP 120 in accordance with various aspects of the disclosed approach for processing a frame 402 for a transmission attempt based on EDCA. The frame processing configuration 400 includes a frame-to-AC mapper 410, a set of transmit queues 420, and a set of EDCAF modules 430.

The frame 402, which has an associated priority UP, may be assigned an AC by the frame-to-AC mapper 410 based on that priority. In accordance with one aspect of the disclosed approach, the assignment of a particular AC to the frame 402 may be achieved based on the associated priority of the frame 402 using the mapping shown in Table 1, above.

The set of transmit queues 420 includes a transmit queue for storing frames associated with each of the four ACs, which includes an AC_VO queue 422, an AC_VI queue 424, an AC_BK queue 426, and an AC_BE queue 428. All frames of the same AC may be stored in the same queue, without regard to the UP associated with the frame. For example, if the frame 402 has an AC of AC_VO and a priority of UP 6, it will be stored in the AC_VO queue 422, which may contain other frames having an AC of AC_VO and a UP of either 6 or 7.

Contention for each of the transmit queues in the set of transmit queues 420 is performed using an independent EDCAF. Accordingly, each of the AC_VO queue 422, the AC_VI queue 424, the AC_BK queue 426, and the AC_BE queue 428 is associated with an EDCAF module in the set of EDCAF modules 430. Specifically, as illustrated in FIG. 4, the set of EDCAF modules 430 includes a EDCAF module 432 for managing the AC_VO queue 422, a EDCAF module 434 for managing the AC_VI queue 424, a EDCAF module 436 for managing the AC_BK queue 426, and a EDCAF module 438 for managing the AC_BE queue 428.

As described, EDCAF is an enhanced version of DCF, and contention for the shared medium operates on the same principles of CSMA/CA and backoff, but adjusted based on the EDCA parameters as shown in Table 2, above. Because the EDCA parameters values are AC-specific, for simplicity of illustration, in FIG. 4 the EDCA parameters specific to an AC may be referred to as AIFS[AC_XX], CW[AC_XX], and TXOP Limit[AC_XX], where "AC_XX" is understood to be one of the four ACs with which the EDCA parameters are associated, and CW[AC_XX] represents a value generated from the CWmin[AC_XX] and CWmax[AC_XX] values associated with the AC. Each EDCAF module determines appropriate backoff times for the frames in the frame transmission queue it manages based on the EDCA parameters associated with the AC assigned to each frame. Thus, the EDCAF uses AC-specific values of AIFS[AC_XX], CWmin[AC_XX] and CWmax[AC_XX], instead of fixed values of DIFS, CWmin, and CWmax.

Conventionally, a single user TXOP (SU-TXOP) defined in IEEE 802.11 standards is utilized for each AC. As such, a SU-TXOP obtained by a station only sets the Network Allocation Vector (NAV) timer for a specific AC (used to contend for the TXOP), to idle during the SU-TXOP period while NAVs for other ACs of the same station are set to busy. NAV is a counter maintained by each station, indicating the time to elapse until the channel is free again, such that a station cannot transmit until its NAV is zero. An EDCA TXOP is granted to Enhanced Distributed Channel Access Function (EDCAF) when the EDCAF determines that it may initiate a frame exchange sequence. During an EDCA SU-TXOP, a wireless station may initiate multiple frame exchange sequences to transmit MAC Management Protocol Data Units (MMPDUs) and/or MSDUs only within the same AC. Internal contention among frames belonging to different ACs allows only one AC to win the internal competition for the TXOP. That AC is the one that is allowed to contend for access to the medium with other wireless nodes in an external contention process.

Various aspects of the disclosed approach may be used to guarantee air time for an AP by dynamic adaptation of EDCA parameters used by the AP in contention. These aspects do not depend on the EDCA parameters used by the STAs for SU and MU contention operations even though the AP may indicate these parameters to each of the STAs. For example, the AP may send the indication in a management frame sent to each STA (e.g., a Probe or Association response) such as a management frame used in the setup of the MU operation mode. Alternatively, the indication may be sent to the STAs in a Beacon. However, there is no guarantee that the STAs receiving the EDCA parameters will perform contention in the same fashion. Further, legacy wireless nodes do not implement contention based on EDCA parameters.

Because these aspects do not depend on the specific EDCA parameters used by the STAs for contention, increased compatibility is introduced as it is irrelevant whether STAs operate under the parameters indicated by the AP. Further, operational complexity is decreased because there is less management involved in the operation of the STA as related to enforcement of compliance to the indicated EDCA parameters.

Various aspects of the disclosed approach for attempting to provide sufficient access by an AP to a communications medium shared with a plurality of STAs include adapting EDCA parameters for the AP so that the "aggressiveness" of the AP in contending for access to the communications medium may be adjusted. Thus, if the AP allowed to be more aggressive, then the AP should be able to increase its access to the communications medium. A measurement of the access of the AP may be referred to by "MU air time", which is defined to be an amount of time the AP may have access to the communications medium for MU transmissions as measured over a particular period of time. The adaptation of the EDCA parameters for the AP may be used to main a certain desired air time, referred to as a "target air time", with regard to transmissions by the AP. In one aspect, the EDCA parameters may be adapted to achieve a certain target air time for the AP in MU transmissions, referred to as a "target MU air time."

Figure 5:
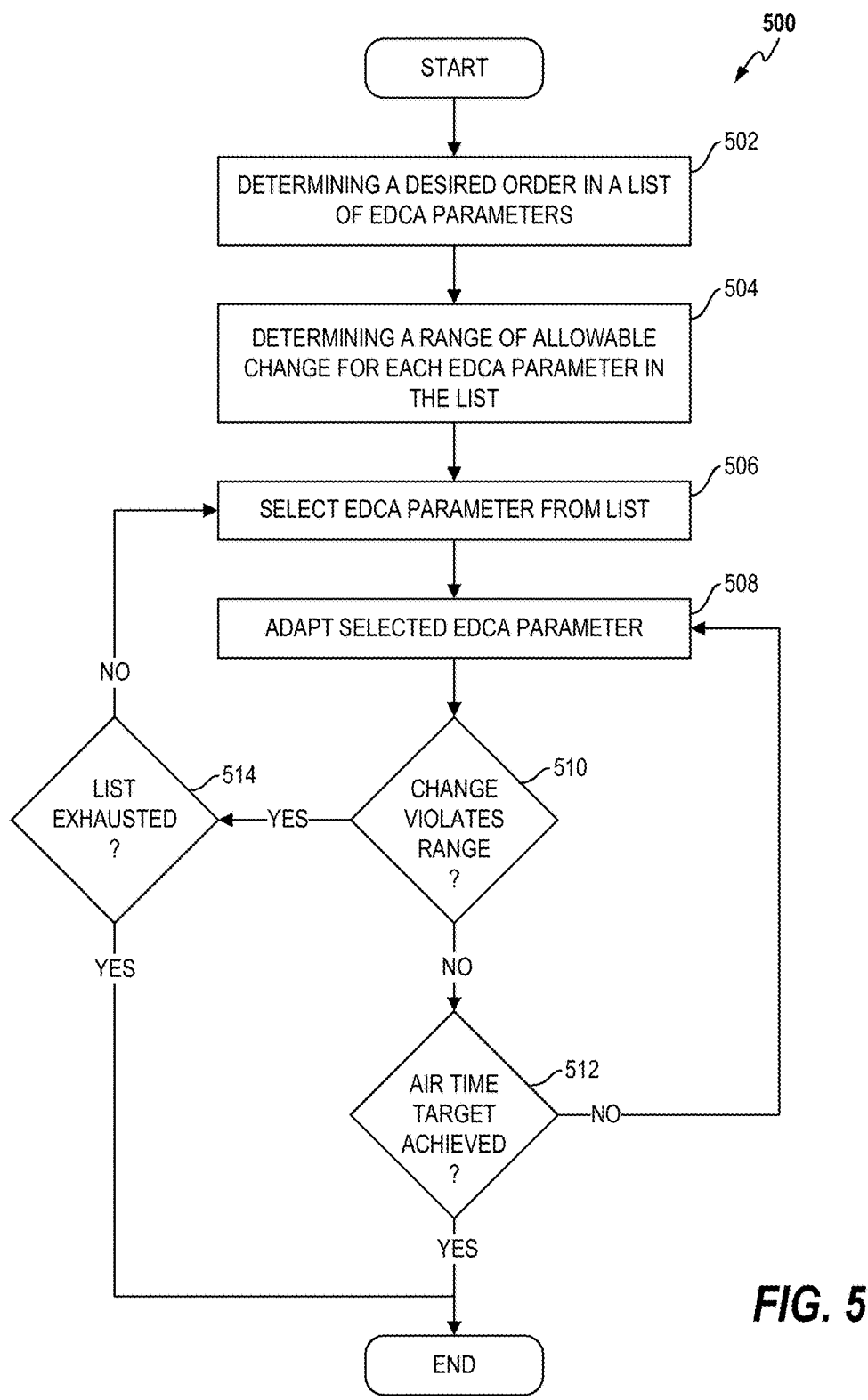
FIG. 5 is a flow diagram of a contention parameter adaptation process configured in accordance with various aspects of the method and apparatus for adaptation of EDCA parameters to ensure access by a wireless node.

FIG. 5 illustrates a contention parameter adaptation process 500 for adaptation, or change, of EDCA parameters that includes, at 502, determining a desired order in a list of the EDCA parameters that may be changed. In one aspect of the disclosed approach, the order may be TXOP Limit, CWmin, CWmax, AIFSN for MU transmissions. Then, to increase MU air time of the AP (i.e., increase ability of the AP to access the medium by contention), the value of TXOP limit used for MU transmission may be increased, and the values of CWmin, CWmax, or AIFSN may be reduced, all subject to an allowable range, as discussed below. Conversely, change in these values may be in a reversed direction to decrease MU air time of the AP.

At 504, an allowable range in which each EDCA parameter in the list may be changed is determined. In one aspect of the disclosed approach, the default EDCA parameter values as shown in Table 2, above, may be used as a starting point. Each EDCA parameter value may then have an associated range, as shown in Table 4, below, where a range is defined by [Range_min, Range_max], Range_min being a lower limit of the range, and Range_max being an upper limit of the range. Values of Range_min and Range_max may be constrained by values defined in a standard. In addition, because each AC has an associated set of EDCA parameters, it should be understood that each EDCA parameter in each set of EDCA parameters has an associated range that may be different from another in another AC. In one aspect of the disclosure, a range for CWmin[AC_VO] may be different than a range for CWmin[AC_VI]. Ranges may also different based on priority level values such as an associated UP value.

TABLE 4

Ranges of Allowable Values for EDCA Parameters

| | Range_min | Range_max |
|---|---|---|
| CWmin (slots) | CWmin_1 | CWmin_2 |
| CWmax (slots) | CWmax_1 | CWmax_2 |
| AIFSN | AIFSN_1 | AIFSN_2 |
| TXOP Limit | TXOP_1 | TXOP_2 |

In one aspect of the disclosure, limits of a range for a particular EDCA parameter may be fixed. In one approach, a range for TXOP Limit may be defined by [TXOP_1, TXOP_2] ms, where TXOP_1 is a fixed amount of 1 ms and TXOP_2 is a fixed amount of 10 ms. In another approach, a range for AIFSN may be defined by [$N_{ut,m}$ AIFSN_1, AIFSN_2], where AIFSN_1 is a fixed amount of 1 and AIFSN_2 is a fixed amount of 5. In another aspect of the disclosure, limits of a range for a particular EDCA parameter may be relative. In one approach, a relative range for CWmin for MU transmission may be defined by [CWmin_1, CWmin_2] slots, where CWmin_1 and CWmin_2 are the values used for CWmin by an SU transmission in AC_VO and AC_BE, respectively. he value of CWmin_1 has been chosen to ensure that CWmin for MU transmissions is not less than CWmin for SU transmission in AC_VO to prevent adversely affecting SU voice latency. In yet another aspect of the disclosed approach, a range for a particular EDCA parameter may have either fixed or relative endpoints, such that, in one approach, a minimum value in the range (Range_min) may be fixed and a maximum value in the range (Range_max) may be relative, or vice versa.

At 506, an EDCA parameter in the list of the EDCA parameters is selected. As discussed, the EDCA parameter is selected based on the order of the EDCA parameters in the list of the EDCA parameters. Continuing with the scenario described above, where TXOP Limit is the first EDCA parameter in the list of the EDCA parameters, if no adaptation has been performed on any EDCA parameters, then TXOP Limit will be selected for adaptation.

At 508, the selected EDCA parameter is adapted to try to achieve the target air time. In one aspect of the disclosed approach, this includes increasing or decreasing the value of the selected EDCA parameter. In one approach, to increase MU air time based on adaptation of EDCA parameters, the TXOP Limit for MU transmissions may first be increased to try to increase the MU air time. If the TXOP Limit reaches its upper limit (e.g., 10 ms), then CWmin may be further reduced for MU transmissions. If CWmin reaches its lower limit of CWmin for SU transmissions in AC_VO (e.g., 7), then AIFSN may further be reduce for MU transmissions. To decrease MU air time (i.e., reduce ability of the AP to access the medium by contention), the EDCA parameters may be adapted in reverse.

The value of the selected EDCA parameter may be increased or decreased, or more generally, changed, by a certain amount, referred to as a step size. For example, the TXOP Limit may be changed by a step size of 0.2 ms instead of 1 ms while CWmin, CWmax, and AIFSN may be changed by a step size of 2 instead of 1. In other words, the step size may be any amount usable to change the selected EDCA parameter and not necessarily a minimal amount that the selected EDCA parameter may be changed.

One description of the EDCA adaptation process is provided using TXOP Limit. In one aspect of the disclosed approach, the value of TXOP Limit may be incremented or decremented by a certain amount (e.g., 0.5 ms), where the value will be incremented for increasing AP MU air time and decremented for decreasing AP MU air time. In another aspect of the disclosed approach, a desired TXOP Limit, MU_TXOP_Target, may be determined by the following formulas:

$$MU\_TXOP\_Target = MU\_TXOP\_Current \times (MU\_AirTime\_Ratio) \quad (2)$$

and $$MU\_AirTime\_Radio = MU\_AirTime\_Target / MU\_AirTime\_Current) \quad (3)$$

where:
MU_TXOP_Current is the current MU TXOP duration, which can be MU TXOP averaged in a previous time period (e.g., 100 ms);
MU_AirTime_Current is the current MU air time as detailed herein; and
MU_AirTime_Target is the target MU air time as detailed herein, and the resulting value of MU_TXOP_Target may be used as an initial guess for the value of TXOP Limit and then fine-tuned further if needed. In one approach, the initial value of TXOP Limit based on the value of MU_TXOP_Target may be incremented or decremented based on the desired amount of TXOP Limit.

At 510, it is determined if the change to the selected EDCA parameter would violate the allowable range associated with the selected EDCA parameter. Specifically, if the changed value of the selected EDCA parameter exceeds the allowable range, then the contention parameter adaptation process 500 continues at 514. Otherwise, if the changed value of the selected EDCA parameter remains in the allowable range, then the contention parameter adaptation process 500 continues at 512.

At 512, it is determined if a target MU air time has been achieved. In one aspect of the disclosed approach, the target MU air time may include an amount of MU air time during which the AP has access to the medium to communicate MU transmissions. In another aspect of the disclosed approach, the target MU air time may include a total amount of air time during which the AP has access to the medium to communicate any transmissions. Further description of whether the target MU air time has been achieved is provided below. If the target MU air time has been achieved, then the contention parameter adaptation process 500 finishes. In another aspect of the disclosed approach, whether the target MU air time has been achieved may be ongoing such that the current MU air time is constantly monitored. In this case, the contention parameter adaptation process 500 may be invoked whenever the current MU air time deviates from the target MU air time from a predetermined amount.

It should be noted that because adaptation of EDCA parameters may not achieve the target MU air time, the contention parameter adaptation process 500 should be understood to be an attempt to provide a wireless node such as the AP more or less MU air time. More specifically, it should be understood that the contention parameter adaptation process 500 may only provide changes to the EDCA parameters that are used by the wireless node to contend for access to the medium and thus there is no specific guarantee that a particular contention operation based on the adaptation will be successful. Consequently, reference to "increasing MU air time" or "decreasing MU air time" should be understood as an "attempt" to the increasing/decreasing of MU air time for the wireless node.

At 514, where the changed value of the selected EDCA parameter has been previously determined to exceed the allowable range at 512, the contention parameter adaptation process 500 determines if the selected EDCA parameter is the last EDCA parameter in the list, meaning that the list of all EDCA parameters that may be adapted has been exhausted. If there are no other EDCA parameters that may be adapted, then the contention parameter adaptation process 500 finishes. However, if the list has not been exhausted, then the contention parameter adaptation process 500 return to 506, where the next EDCA parameter from the list will be selected.

In one aspect of the disclosed approach, the adaptation of parameters for the AP may be made in view of a measured amount of MU air time, referred to as a "current MU air time", for the AP. Thus, any effects from adaptation during the contention parameter adaptation process 500 of FIG. 5, above, may be determined as the current MU air time. The MU current air time may then be compared to the MU target air time to see if further adaptation of the parameters is needed.

In another aspect of the disclosed approach, the period of time over which the current MU air time is determined may be different than the period of time over which the target MU air time is determined. In one approach, a relatively short period of time may be used in evaluating (measured) current MU air time, while a longer period of time may be used for defining the target MU air time. Different periods of time used to evaluate the current MU air time and the target MU air time may equate to more (or less) volatility in the adaptation approach because either the evaluation of the current effectiveness of the adaptation may be made, and/or the goal of the adaptation may be adjusted, more (or less) frequently.

In yet another aspect of the disclosed approach, adaptation may be deemed successful if the current MU air time is within a particular range of the target MU air time. Thus, in one approach, the current MU air time may be within 10% of the target MU air time for the adaptation to be terminated.

Figure 6:
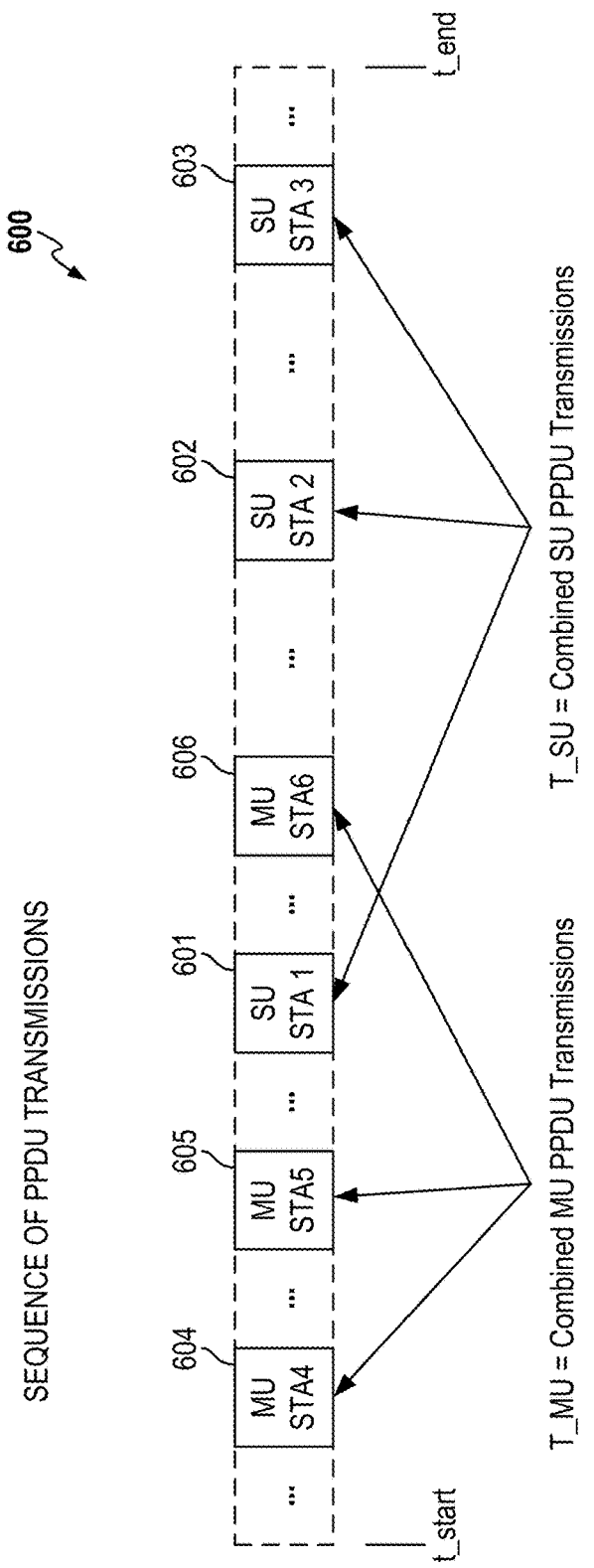
FIG. 6 is a block diagram of a sequence of frame transmissions that may be used to describe various aspects of the method and apparatus for adaptation of EDCA parameters to ensure access by a wireless node disclosed herein.

FIG. 6 illustrates a sequence of frame transmissions 600 in a BSS such as the BSS in FIG. 1 that includes an AP such as the AP 120 and a group of STAs such as the set of STAs 104 using which various aspects of the disclosed approach for determining the measured amount of MU air time may be described. Each frame in the sequence of frame transmissions 600 may be a data unit as defined by the IEEE 802.11 standard. Specifically, the IEEE 802.11 PHY layer may be said to be divided into two sublayers: (1) a Physical Layer Convergence Protocol (PLCP) sublayer and a Physical Medium Dependent (PMD) sublayer. For transmit operations, the PLCP sublayer prepares frames received from the MAC layer for transmission by taking each frame and creating a PPDU. The PMD sublayer handles the details of transmission and reception of individual bits on a physical medium. In other words, the PLCP sublayer takes each frame that a station wishes to transmit and forms a PPDU for transmission at the PMD sublayer.

The sequence of frame transmissions 600, which spans a period, such as a period of time, referred to as a MU air time measurement period that may be determined by:

$$\text{MU air time measurement period} = t\_end - t\_start \quad (4)$$

where t_start is the start time of the MU air time measurement period and t_end is the end time of the MU air time measurement period. In one approach, the MU air time measurement period may span 100 ms.

The sequence of frame transmissions 600 includes a first amount of time, T_MU, used by MU PPDU transmissions by the AP and a second value of time, T_SU, used by SU PPDU transmissions by all STAs in SU mode. T_MU may optionally include UL MU transmissions from STAs. As shown in the figure, the sequence of frame transmissions 600 includes an SU PPDU 601 associated with a first STA (STA1), an SU PPDU 602 associated with a second STA (STA2), and an SU PPDU 603 associated with a third STA (STA3). In addition, the sequence of frame transmissions 600 includes an MU PPDU 604 associated with a fourth STA (STA4), an MU PPDU 605 associated with a fifth STA (STA5), and an MU PPDU 606 associated with a sixth STA (STA6).

In one aspect of the disclosed approach, current MU air time may be determined as:

$$\text{current MU air time} = T\_MU/(t\_end - t\_start) \quad (5)$$

which is a measurement based on time used by the MU PPDU transmissions with respect to the MU air time measurement period. This measurement may be expressed as a percentage.

In another aspect of the disclosed approach, current MU air time may be determined as:

$$\text{current MU air time} = T\_MU/(T\_MU + T\_SU \quad (6)$$

which is a measurement based on a ratio of (1) the time used by the MU PPDU transmissions, as compared to (2) the time used by the MU PPDU and SU PPDU transmissions. This measurement may also be expressed as a percentage.

In accordance with various aspects of the disclosed approach, the current MU air time may be referred to as a "metric" or a "metric value" in so far as the current MU air time is related to a standard for measurement or evaluation. In one approach, as discussed above, the current MU air time is related to a measurement of time used by the MU PPDU transmissions. Thus, the current MU air time may be thought of as a metric value that may be determined by measuring an amount of access of a medium, such as over a period of time. The metric value may be expressed as a ratio or percentage.

After the current MU air time has been determined, it may be compared to the target MU air time, where the target MU air time may be defined as a fixed value, a dynamic value, or a range of values. In one approach, the target MU air time may be a fixed value of 0.7 or, expressed as a percentage, 70%. In another approach, the target MU air time may be a function based on a ratio of a number of STAS in SU mode as compared to a number of STAs in MU mode:

$$\text{target MU air time} = Y/(X+Y), \quad (7)$$

where X and Y are the number of STAs in SU and MU modes, respectively. In yet another approach, the target MU air time may be defined to be within an acceptable range such as:

$$(\text{target MU air time} - \text{low\_threshold}, \text{target MU air time} + \text{high\_threshold}), \quad (8)$$

where low_threshold and high_threshold may be fixed or dynamic values expressed as numbers or percentages. In this approach, if the current MU air time exceeds the upper end of the acceptable range (i.e., the current MU air time is greater than the target MU air time+high_threshold), then the contention parameter adaptation process 500 may be used in an attempt to affect the new current MU air time that will be determined in the following MU air time measurement period by decreasing access to the medium by the AP.

It should be noted that, in general, various aspects of the disclosure related to how the various MU air times, such as the current MU air time and the target MU air time, and whether the target MU air time has been reached have been described using units of time, other suitable units of measurement may be used. In another aspect of the disclosure, another suitable unit of measurement may be a slot, or slot time, defined in the IEEE 802.11 specification (e.g., slot time is 9 us in IEEE 802.11ac).

As discussed, an MU frame that may be communicated by an AP such as the AP 120 is the trigger frame. It is desirable to be able to guarantee that trigger frames are able to allocate enough airtime for MU UL transmissions. In one aspect of the disclosed approach, a ratio referred to as a Target_MU-SU_AirTime_Ratio between MU and SU transmissions may be determined to be:

$$\text{Target\_MU-SU\_AirTime\_Ratio} \approx Y/X$$

where Y is the number of STAs operating in MU mode, and X is the number of STAs operating in SU mode. An exact value Target_MU-SU_AirTime_Ratio will vary according to traffic profiles used for MU and SU transmissions.

In accordance with various aspects of the disclosed approach, considering a single BSS in the system 100 in FIG. 1 with an AP such as the AP 120 and a set of STAs such as the set of STAs 104, the following EDCA parameters may be adapted to achieve a desired target MU air time include: TF CWmin (CWmin associated with a TF transmission), SU CWmin (CWmin associated with an SU transmission), TF TXOP Limit (TXOP Limit associated with a TF transmission), and SU TXOP Limit (TXOP Limit associated with an SU transmission). It should be noted that adaptation of CWmin may also be achieved using adaptation of AIFSN, but the latter option may provide less adaptation space (e.g., legacy AIFSN is already as small as 2).

Where TF CWmin is adapted, the AP may make the EDCA contention parameters associated with the trigger frame more aggressive to increase air time for triggered STAs. In this approach, it is difficult to formulate optimal CWmin values in general given mixed ACs with different number of STAs and non-Full Buffer traffic. Further, when optimal TF CWmin is small, it may be difficult to: (1) maintain low latency for SU voice data; and/or (2) maintain low collision rate in cases where there are multiple APs.

Where SU CWmin may be adapted, the AP may decrease the priority of STAs in SU mode in an attempt to increase air time for triggered STAs. However, in general it may be difficult to formulate optimal CWmin values. In addition, wireless nodes such as STAs that do not implement the IEEE 802.11ax standard may not obey the EDCA contention parameters specified by the AP.

Where TF TXOP may be adapted, the AP decreases TXOP Limit of STAs in SU mode to provide triggered STAs more airtime. However, wireless nodes such as STAs that do not implement the IEEE 802.11ax standard may not obey the EDCA contention parameters specified by the AP. Further, generally efficiency drops if an optimal value of SU TXOP required to achieve target MU air time is short.

Where TF TXOP Limit may be adapted, the AP increases TXOP Limit for trigger frame to provide triggered STAs more airtime. However, when the target MU air time is high, an optimal TF TXOP Limit may be too long (e.g., TF TXOP Limit being greater than 10 ms).

In one aspect of the disclosed approach, adaptation of TF TXOP Limit is used because AP-side adaptation is fully supported without concern of capabilities available at each STA. It has been observed that even STAs that have been certified as compliant with IEEE 802.11n/ac standards may not obey an EDCA command from the AP. In addition, legacy STAs do not understanding EDCA commands.

Another benefit of adaptation of TF TXOP Limit is that it is relatively easy to formulate optimal TF TXOP Limit in general cases, an approach of which has been described with respect to FIG. 5. Further, adaptation of TF TXOP Limit allows low latency to be maintained for SU voice traffic because SU voice frames may have a smaller or equal CWmin value than TF where a lower end of an allowed range of TF CWmin values associated with TF adaptation is constrained to maintain low voice latency (e.g., TF CWmin should not be less than SU voice CWmin), as described above. Further still, heavy collisions among multiple APs may be avoided because TF CWmin values may not need to be decreased to a very small amount.

Figure 7:
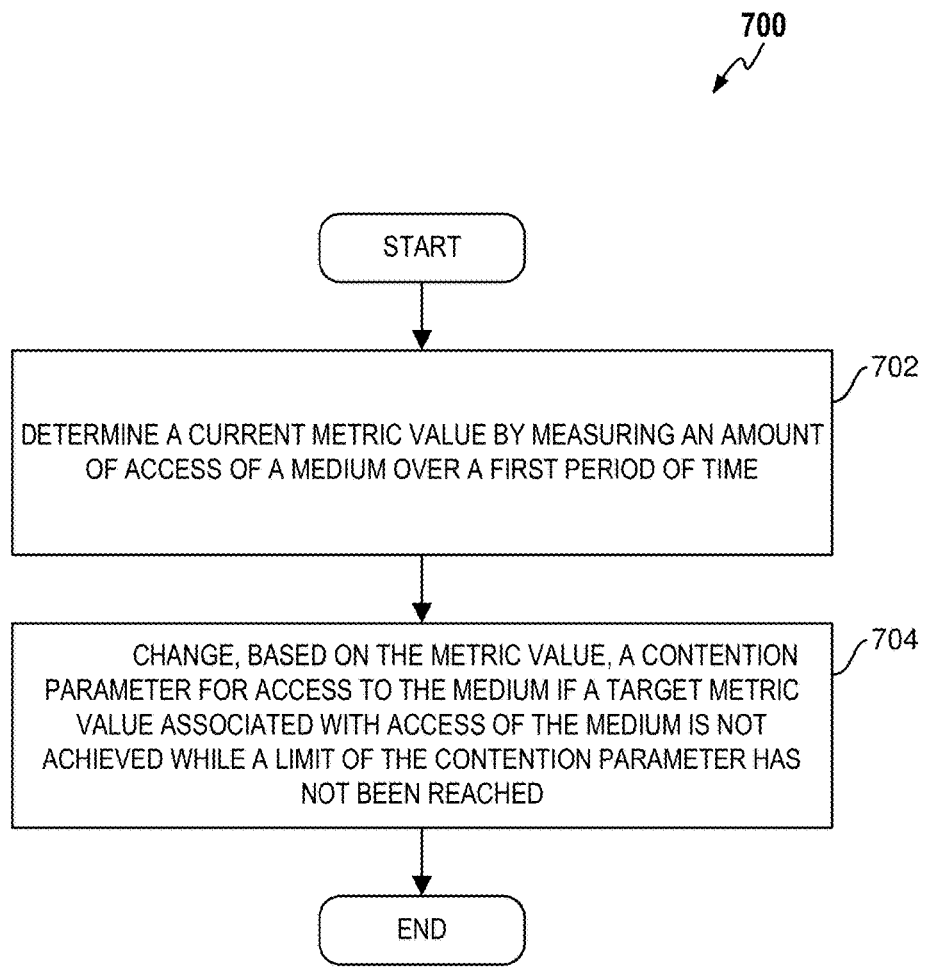
FIG. 7 is a flow diagram of operations for wireless communications configured in accordance with certain aspects of the present disclosure.

In another aspect of the disclosed approach, both TF TXOP Limit and the TF CWmin may be adapted, as discussed above, where TF TXOP may be adapted first until it exceeds an allowable range (e.g., TF TXOP is greater than 10 ms), and thereafter TF CWmin may be adapted to a value that is not be less than the value used for SU voice CWmin to maintain low voice latency FIG. 7 illustrates a wireless communications process 700 configured in accordance with the method and apparatus for adaptation of EDCA parameters to ensure access by a wireless node. At 702, a current metric value associated with access to a medium by a device measured over a first period of time is determined. The device may be a wireless node such an AP, including the AP 120. The current metric value may be an MU air time of access to a medium by the AP such as the current MU air time described herein.

At 704, based on the current metric value, a contention parameter of the device for access to the medium is changed if a target metric value associated with access of the medium is not achieved while a limit of the contention parameter has not been reached. The target metric value may be a desired MU air time of access to the medium by the AP, such as the target MU air time described herein. The collision avoidance parameter may be an EDCA parameter selected to achieve the desired air time.

Several aspects of a telecommunications system have been presented with reference to a WLAN system. As those skilled in the art will readily appreciate, various aspects described throughout this disclosure may be extended to other network systems, network architectures, and communication standards.

Figure 8:
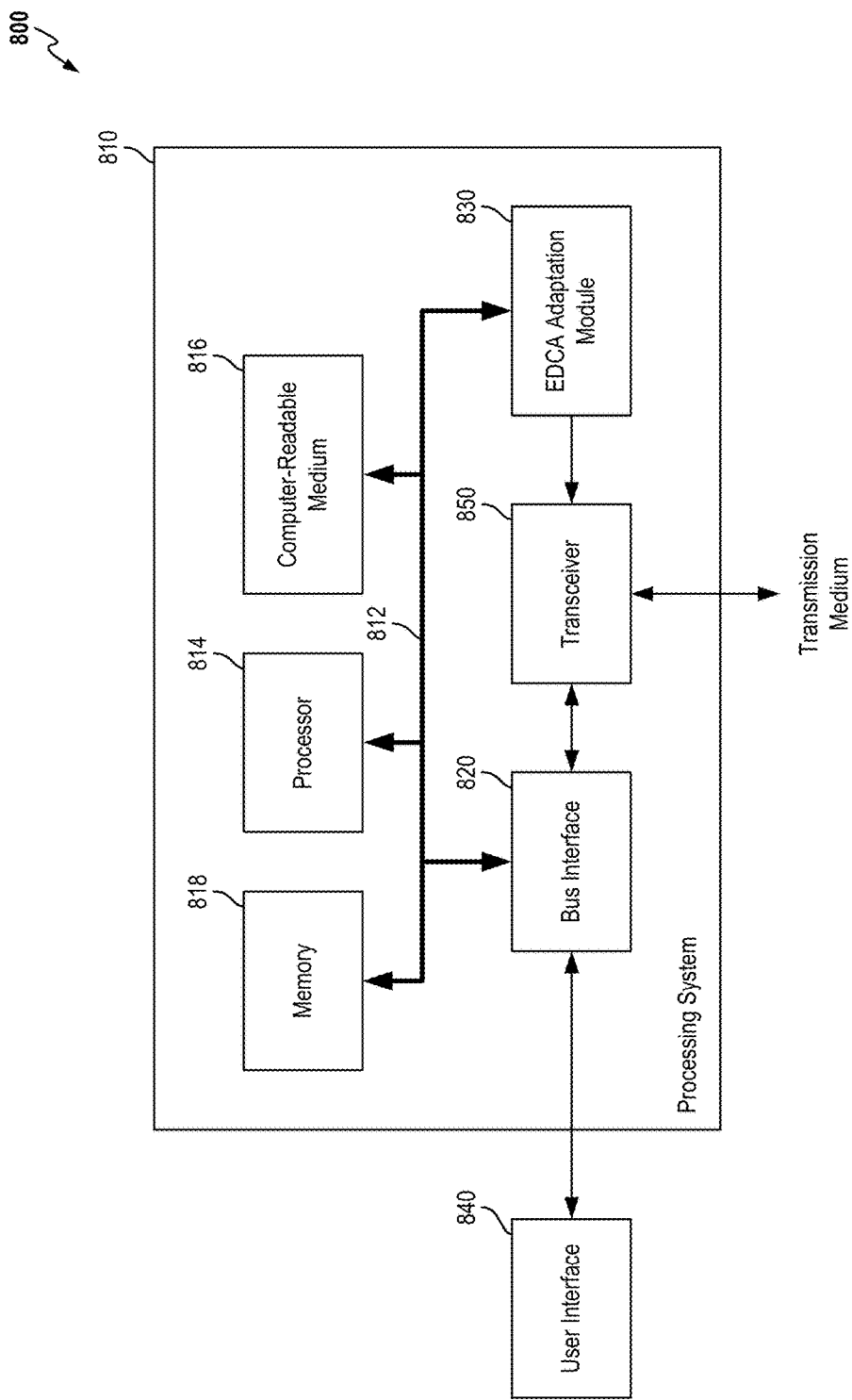
FIG. 8 is a block diagram illustrating a hardware implementation for an apparatus employing a processing system that be used to implement an AP or a STA configured in accordance with various aspects of the method and apparatus for adaptation of EDCA parameters to ensure access by a wireless node disclosed herein.

FIG. 8 is a conceptual diagram illustrating aspects of a hardware implementation for an apparatus 800 employing a processing system 810 that may be used to implement various aspects of the disclosed approach in the method and apparatus for adaptation of EDCA parameters to ensure access by a wireless node, such as the contention parameter adaptation process 500 FIG. 5 or the wireless communications process 700 of FIG. 7. In accordance with various aspects of the disclosure, the apparatus 800 may be used to implement any device, including a wireless node. In one approach, the apparatus 800 may be used to implement a wireless device such as an AP, including the AP 120, or a STA, including the STAs in the set of STAs 104.

In one aspect, the processing system 810 includes one or more processors illustrated as a processor 814. Examples of processors 814 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processing system 810 may be implemented as having a bus architecture, represented generally by a bus 812. The bus 812 may include any number of interconnecting buses and bridges depending on the specific application of the processing system 810 and overall design constraints. The bus 812 links together various circuits including one or more processors (represented generally by the processor 814), a memory 818, computer-readable media (represented generally by a computer-readable medium 816), and a EDCA adaptation module 830. The bus 812 may also link various other circuits such as timing sources, peripherals, voltage regulators, and power management circuits, which are well known in the art, and therefore, will not be described any further. A bus interface 820 provides an interface between the bus 812 and a transceiver 850. The transceiver 850 provides a means for communicating with various other apparatus over a transmission medium. Depending upon the nature of the apparatus, a user interface 840 (e.g., keypad, display, speaker, microphone, joystick) may also be provided.

The processor 814 is responsible for managing the bus 812 and general processing, including execution of software that may be stored on the computer-readable medium 816 or the memory 818. The software, when executed by the processor 814, causes the processing system 810 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The EDCA adaptation module 830 may implements various processes as described herein, such as the contention parameter adaptation process 500 FIG. 5 and/or the wireless communications process 700 of FIG. 7. In one aspect of the disclosure, the EDCA adaptation module 830 may be implemented directly in hardware. In another aspect of the disclosure, the EDCA adaptation module 830 may be embodied in software, or a software module executed by a processor. In yet another aspect of the disclosure, the EDCA adaptation module 830 may be implemented in a combination of hardware or software. Examples of hardware and software are described herein. Conceptually, the EDCA adaptation module 830 is represented as a separate module, but it should be understood by those of ordinary skill in the art that the functionality provided by the EDCA adaptation module 830 may be provided by other elements in the processing system 810, such as the processor 814.

The computer-readable medium 816 or the memory 818 may also be used for storing data that is manipulated by the processor 814 when executing software. The computer-readable medium 816 may be a non-transitory computer-readable medium such as a computer-readable storage medium. A non-transitory computer-readable medium includes, by way of example and not limitation, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example and not limitation, a carrier wave, a transmission line, and any other suitable medium for transmitting software and/or instructions that may be accessed and read by a computer. Although illustrated as residing in the processing system 810, the computer-readable medium 816 may reside externally to the processing system 810, or distributed across multiple entities including the processing system 810. The computer-readable medium 816 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

In one configuration, the wireless device 800 includes, in addition to the transceiver 850, means for determining a metric value associated with access of a medium by measuring an amount of access of the medium over a first period of time; and means for changing, based on the metric value, a contention parameter for access to the medium if a target metric value associated with access of the medium is not achieved while a limit of the contention parameter has not been reached. In one aspect of the disclosed approach, the aforementioned means may include the processor 814 or, in general, the processing system 810, as configured to perform the recited functions. In another aspect of the disclosed approach, the aforementioned means may include a module or any apparatus configured to perform the functions recited by the aforementioned means. In one aspect of the disclosure, the aforementioned means may include the EDCA adaptation module 830. In general, means for certain functionality in the method and apparatus for adaptation of EDCA parameters to ensure access by a wireless node include the processor 814, the processing system 810, the EDCA adaptation module 830, or other modules in the wireless device 800 implementing the contention parameter adaptation process 500 FIG. 5 or the wireless communications process 700 of FIG. 7.

In one aspect, means for processing, means for determining, or means for changing comprise a processing system, which may include one or more processors, such as the processor 814, the processing system 810, the EDCA adaptation module 830, or other modules in the wireless device 800 implementing the contention parameter adaptation process 500 FIG. 5 or the wireless communications process 700 of FIG. 7.

In another aspect, means for changing the amount of access of the medium based on a comparison of the metric value to the target metric value may include the processor 814, the processing system 810, the EDCA adaptation module 830, or other modules in the wireless device 800. As described in the contention parameter adaptation process 500 FIG. 5, one or more EDCA parameters may be adapted to increase/decrease access to the medium.

In yet another aspect, means for changing, based on the metric value, a second contention parameter for access to the medium if the target metric value associated with access of the medium is not achieved while a limit of the second contention parameter has not been reached, may include the processor 814, the processing system 810, the EDCA adaptation module 830, or other modules in the wireless device 800. As described in the contention parameter adaptation process 500 FIG. 5, if the target MU air time may not be achieved by adapting a first EDCA parameter (e.g., the first contention parameter), then a second EDCA parameter (e.g., the second contention parameter) may be adapted.

In yet another aspect, means for changing the contention parameter based on a step size may include the processor 814, the processing system 810, the EDCA adaptation module 830, or other modules in the wireless device 800 implementing the contention parameter adaptation process 500 FIG. 5, where the EDCA parameter may be adapted by an amount corresponding to a step size.

In yet another aspect, means for determining the target metric value over a second period of time may be implemented by the processor 814, the processing system 810, the EDCA adaptation module 830, or other modules in the wireless device 800. As described in the contention parameter adaptation process 500 FIG. 5, during the process of adapting the second EDCA parameter (e.g., the second contention parameter) described above, a second period of time may be used.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A storage medium may be coupled to a machine such as, by way of example and not limitation, to a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

If implemented in software, the functions may be stored or transmitted over as one or more instructions or code on a computer-readable medium. Computer-readable media include both computer storage media (or computer-readable storage media) and communication media including any medium that facilitates transfer of a computer program from one place to another. A storage medium may be any available medium that can be accessed by a computer. By way of example and not limitation, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media or computer-readable storage media). In addition, for other aspects computer-readable media may comprise transitory computer-readable media (e.g., a signal). Combinations of the above should also be included within the scope of computer-readable media.

The computer-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example and not limitation, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

In some cases, rather than actually transmitting a frame a device may have an interface to output a frame for transmission. In one aspect of the disclosure, a processor may output a frame, via a bus interface, to a radio frequency (RF) front end for transmission. Similarly, rather than actually receiving a frame, a device may have an interface to obtain a frame received from another device. In one aspect of the disclosure, a processor may obtain (or receive) a frame, via a bus interface, from an RF front end for reception.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more."

Unless specifically stated otherwise, the term "some" refers to one or more. A phrase referring to "at least one or a list of" items refers to any combination of those items, including single members. In addition, terminology of the form "at least one of a, b, or c" or "one or more of a, b, or c" used in the description or the claims means "a or b or c or any combination of these elements." For example, this terminology may include a, orb, or c, or a and b, or a and c, or a and b and c, or 2a, or 2b, or 2c, or 2a and b, and so on.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements.

As used herein, the term "determining" encompasses a wide variety of actions. By way of example and not limitation, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Further, "determining" may include resolving, selecting, choosing, establishing, and the like.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An apparatus for wireless communication comprising:
   a processing system configured to:
   determine a metric value by measuring, over a first period of time, an amount of access by the apparatus of a medium that supports a plurality of communication links, wherein the amount of access by the apparatus is communication by the apparatus on a multiple of the plurality of communication links simultaneously; and
   change, based on the metric value, a contention parameter for access to the medium by the apparatus if a target metric value associated with access of the medium by the apparatus to communicate on the multiple of the plurality of communication links simultaneously is not achieved while a limit of the contention parameter has not been reached, wherein the change of the contention parameter comprises: choosing the limit of the contention parameter from a range of potential limits.

2. The apparatus of claim 1, wherein the contention parameter is associated with contention access by the apparatus of a medium shared with other devices.

3. The apparatus of claim 1, wherein the metric value comprises an air time value.

4. The apparatus of claim 1, wherein the metric value comprises a throughput value.

5. The apparatus of claim 1, wherein the processing system is further configured to change the amount of access of the medium by setting the limit of the contention parameter that is used by the apparatus to another value in the range of potential limits based on a comparison of the metric value to the target metric value.

6. The apparatus of claim 1, wherein the processing system is further configured to:
   change, based on the metric value, a second contention parameter for access to the medium if the target metric value associated with access of the medium is not achieved while a limit of the second contention parameter has not been reached.

7. The apparatus of claim 1, wherein the change of the contention parameter comprises changing the contention parameter based on a step size.

8. The apparatus of claim 1, wherein the processing system is further configured to determine the target metric value over a second period of time.

9. The apparatus of claim 8, wherein the determination of the target metric value is based on a percentage of the second period of time.

10. The apparatus of claim 1, wherein the target metric value is not achieved if the metric value is not within a range of the target metric value.

11. The apparatus of claim 1, wherein the contention parameter comprises at least one of a minimum contention window size, a maximum contention window size, an arbitration inter-frame space number, or a transmission opportunity period.

12. A method for wireless communication comprising:
    determining a metric value by measuring, over a first period of time, an amount of access of a medium that supports a plurality of communication links by a device that communicates on a multiple of the plurality of communication links simultaneously; and
    changing, based on the metric value, a contention parameter for access to the medium by the device to communicate on the multiple of the plurality of communication links simultaneously if a target metric value associated with access of the medium is not achieved while a limit of the contention parameter has not been reached, wherein the changing of the contention parameter comprises:
    choosing the limit of the contention parameter from a range of potential limits.

13. The method of claim 12, wherein the metric value comprises an air time value.

14. The method of claim 12, wherein the metric value comprises a throughput value.

15. The method of claim 12, further comprising changing the amount of access of the medium by setting the limit of the contention parameter that is used by the device to another value in the range of potential limits based on a comparison of the metric value to the target metric value.

16. The method of claim 12, further comprising:
    changing, based on the metric value, a second contention parameter for access to the medium if the target metric value associated with access of the medium is not achieved while a limit of the second contention parameter has not been reached.

17. The method of claim 12, further comprising determining the target metric value over a second period of time.

18. The method of claim 17, wherein the determination of the target metric value is based on a percentage of the second period of time.

19. The method of claim 12, wherein the target metric value is not achieved if the metric value is not within a range of the target metric value.

20. A wireless node comprising:
- a transceiver configured to communicate over a medium that supports a plurality of communication links; and
- a processing system coupled to the transceiver, the processing system configured to:
  - determine a metric value associated with access of the medium by the transceiver by measuring an amount of access of the medium by the transceiver to communicate on a multiple of the plurality of communication links simultaneously over a first period of time; and
  - change, based on the metric value, a contention parameter for access to the medium if a target metric value associated with access of the medium by the transceiver to communicate on the plurality of communication links simultaneously is not achieved while a limit of the contention parameter has not been reached, wherein the change of the contention parameter comprises:
- choosing the limit of the contention parameter from a range of potential limits.

* * * * *